United States Patent [19]

Reed

[11] Patent Number: 5,263,181
[45] Date of Patent: Nov. 16, 1993

[54] REMOTE TRANSMITTER FOR TRIGGERING A VOICE-OPERATED RADIO

[75] Inventor: John D. Reed, Arlington, Tex.

[73] Assignee: Motorola, Inc., Schaumburg, Ill.

[21] Appl. No.: 599,583

[22] Filed: Oct. 18, 1990

[51] Int. Cl.$^5$ ............................................. H04B 1/06
[52] U.S. Cl. ................................. 455/152.1; 455/92; 455/151.2; 455/352
[58] Field of Search ................. 455/88, 92, 70, 352, 455/79, 151, 152, 153, 143, 353, 38.2; 381/42, 43, 110; 379/58, 102, 67, 88; 340/825.69, 825.72

[56] References Cited

U.S. PATENT DOCUMENTS

| | | | |
|---|---|---|---|
| 4,119,797 | 10/1978 | Wollert | 381/110 |
| 4,291,411 | 9/1981 | Muller et al. | 455/88 |
| 4,426,733 | 1/1984 | Brenig | 455/79 |
| 4,593,155 | 6/1986 | Hawkins | 455/88 |
| 4,606,073 | 8/1986 | Moore | 455/54.1 |
| 4,776,034 | 10/1988 | Matsuo | 455/54 |
| 4,827,518 | 5/1989 | Feustel et al. | 381/42 |
| 4,864,622 | 9/1989 | Iida et al. | 381/42 |
| 4,922,538 | 5/1990 | Tchorzewski | 381/42 |
| 4,940,964 | 7/1990 | Dao | 340/438 |
| 5,077,831 | 12/1991 | Weber | 455/92 |
| 5,127,043 | 6/1992 | Hunt et al. | 381/42 |

FOREIGN PATENT DOCUMENTS 0082726 3/1990 Japan ................................. 455/38.1

Primary Examiner—Reinhard J. Eisenzopf
Assistant Examiner—Nguyen Vo
Attorney, Agent, or Firm—Juliana Agon

[57] ABSTRACT

A remotely triggered radio is provided with a remote transmitter (10, 10') for transmitting an information signal. There is a triggering switch (18, 18') in the remote transmitter for triggering the remote transmitter to activate an operation (78) of a radio based on the information signal. A receiver (80) of the radio receives the information signal from the remote transmitter. A controller (45) in the radio determines when a termination of the operation of the radio is desired and deactivates the operation of the radio.

25 Claims, 3 Drawing Sheets

REMOTE TRANSMITTER FOR TRIGGERING A VOICE-OPERATED RADIO

TECHNICAL FIELD

This invention relates generally to the activation of an operation of a voice operated radio and, more particularly, the remote activation of a voice recognition system, or a voice-operated switch (VOX) connected to a transmitter.

BACKGROUND

In many prior art voice-recognition systems, the operator or speaker must first "log in", manipulate or adjust one or more control knobs or buttons to enter an identification code, or otherwise inform the voice recognizer of who the operator is so that the recognizer can reference the voice templates which were generated when the operator trained the system to his or her voice initially. Since voice recognition systems are often speaker dependent, a set of templates is required for each user. If several users were using the same recognizer system, a set-up code for keyboard entry would be required to specify which user template to be used for the recognition system.

This "logging in" procedure is therefore inefficient since one purpose of voice control of a two-way mobile radio is to alleviate the need to divert a driver's attention from operating the vehicle to manipulate or adjust such knobs on the radio. In addition, this procedure is cumbersome. It forces the operator to remember another number, for example, to identify what car number the operator is in, which batch number he or she has, and which user the operator is. Thus this cumbersome method detracts from the main purpose of using voice control in the first place, which is to improve usability.

There is also another problem in using voice-operated commands or functions to operate a mobile radio in a vehicle. Since normal conversations inherently occur inside vehicles, a VOX-operated transmitter or a voice-controlled radio will (unless deactivated) try to transmit or operate on every word that is detected. For example, a voice command or keyword used accidentally during a conversation could cause an undesired function to be performed by a voice recognition unit.

Earlier developments of voice recognition systems for high noise environments have typically utilized head mounted or hand-held microphones. Such systems have attempted to overcome the problem of background noise by requiring that the microphone be positioned close to the mouth. Although this may be a somewhat effective solution for this type of system, a head mounted or hand-held microphone arrangement is not practical, nor acceptable, for many systems.

For use in a vehicle, the most desirable types of voice recognition systems are those which operate hands-free. A hands-free system is extremely practical in cases where the operator is required to manually handle controls, such as while driving. However, due to the high background noise in such an environment, the speech recognition system must be able to accurately distinguish words from the background noise, and other conversations, as well as free the operator from manual control of a microphone. A system of this kind offers substantial improvement to the operator's productivity and concentration.

Therefore what is needed is a simple method to reduce the percentage of time that an undesired operation (VOX or voice recognition unit) of a voice operated mobile radio is triggered in a high noise or conversation laden environment.

SUMMARY OF THE INVENTION

Accordingly, it is an object of the present invention to provide a simple method to remotely trigger an operation of a voice-operated mobile radio when the operation is desired.

Briefly, according to the invention, a remotely triggered radio provides for a remote transmitter for transmitting an information signal. There is a triggering switch in the remote transmitter for triggering the remote transmitter to activate an operation of a radio based on the information signal. A receiver of the radio receives the information signal from the remote transmitter. A controller in the radio determines when a termination of the operation of the radio is desired and deactivates the operation of the radio.

In one aspect of the invention, the radio operation to be activated is a voice recognition unit.

In another aspect of the invention, the radio operation to be activated is a voice operated switch.

In a further aspect of the invention, the radio operation to be activated is to activate a local transmitter of the radio subsequently controlled by the voice operated switch.

DETAILED DESCRIPTION OF THE PREFERRED EMBODIMENT

Figure 1:
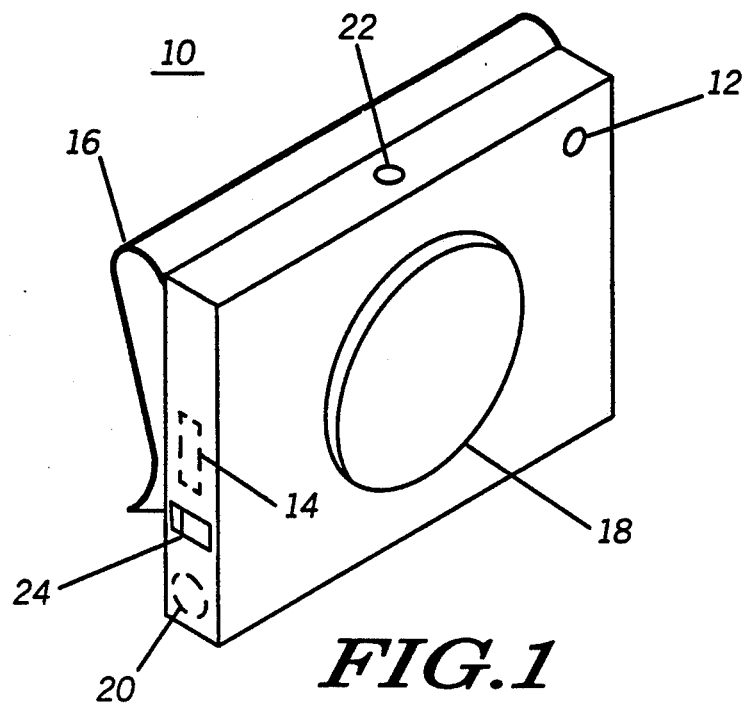
FIG. 1 is a conceptual drawing of an activation unit in accordance with the invention.

Referring to FIG. 1, a conceptual drawing of a pocket activation unit 10 is illustrated which will trigger an operation of a mobile radio. As a remote unit, the activation unit 10 contains an internal battery 20 and a low battery indicator 22. Since the activation unit 10 is only providing a short, low power transmission to generate an initial triggering or information signal, the battery consumption rate would be low. Since transmission would only be used a few dozen times per day and hence may add up to only a couple of seconds of total transmit time per day. Therefore, a very long battery life is envisioned where the low battery indicator 22 would not be lighted or sounded very often. Since a large battery is not needed, the activation unit 10 may be very small and light weight. The small activation unit 10 may then be worn in the shirt pocket or attached on a belt via a mounting clip 16. The activation unit 10 could also be mounted in a convenient place such as on or near a steering wheel of a vehicle.

Basically, the activation unit 10 comprises transmitter means 12 which may be keyed to the user's own identification code (ID) 14. Transmitting means 12 in the activation unit 10 may be actuated by a light tap of the hand or a push on a push button or activation switch 18 to send the information signal containing ID information, if desired, along with a triggering signal to activate an operation of a mobile radio. The push button 18 can thus give a tactile feedback when pushed. A second press of the push button 18 may optionally be used to provide a second transmission which can be interpreted as a deactivation signal for the previously activated operation of the mobile radio. Depending on the transmission system desired, transmitter means 12 may be an ultrasonic transducer for an ultrasonic transmission, an infrared emitter for an infrared transmission, an internal RF antenna for a low power RF signal to be transmitted, or a speaker or audio transducer for transmitting audible sounds.

With the user's ID stored in an internal dip switch, programmable memory (PROM) or other types of memory 14 in the activation unit 10, the user identification code (ID) can be specified and sent at the time the triggering is initiated, thus automatically identifying the user. This could be useful to match up a user with the user's own voice template, previously stored in the mobile radio, used for the voice recognition process. Along with sending ID information, other types of information may also be sent in the triggering signal. At least one feature switch 24 may be used to update user information and operational parameters (such as turning on or off of lights) of a radio that is to receive the triggering signal sent by the activation unit 10.

One illustrative use of the feature switch 24 is its use as an enable or disable PTT ID switch to insert an automatic PTT ID at the beginning of each transmission of the mobile radio, the ID actually coming from the remote unit 10. The PTT ID is the mobile's previously stored identification number sent at the beginning of each transmission. High or low power setting for the triggering transmission may be another usage for the feature switch 24. Another example of the use of the feature switch 24 would be to enable or disable an audible "Talk Permit" tone to be generated in the mobile radio and produced by the mobile speaker. This talk permit tone, if selected, could sound when the triggering signal was received, thus giving an audible feedback to the user that the triggering function has been successful.

Another illustrative use of the feature switch 24 is the selection of either a keyword controlled voice recognition operation of the mobile radio control a radio function or a voice operated switch (VOX) to control the transmitter of a mobile radio upon activation of the activation unit 10.

The feature switch 24 could also select the manner in which the triggering signal is used to trigger the transmit function. In one usage, the triggering signal could cause the radio to immediately enter the transmit mode and activate a microphone and the VOX function. The radio would then continue to transmit until the user stops talking, as determined by the VOX function, or until a determination is made to stop transmitting.

Alternatively, the triggering signal could be used to activate only the microphone and the VOX function which would then monitor the audio present to determine whether the radio should start transmitting. In this case, audio samples obtained from the microphone would be stored in a buffer while the VOX decision is being made. This buffer is then replayed from the beginning when the transmitter is enabled such that no audio is lost. This concept of buffering and replaying the audio samples within a VOX or Voice Recognition function is well known in the art.

Figure 2:
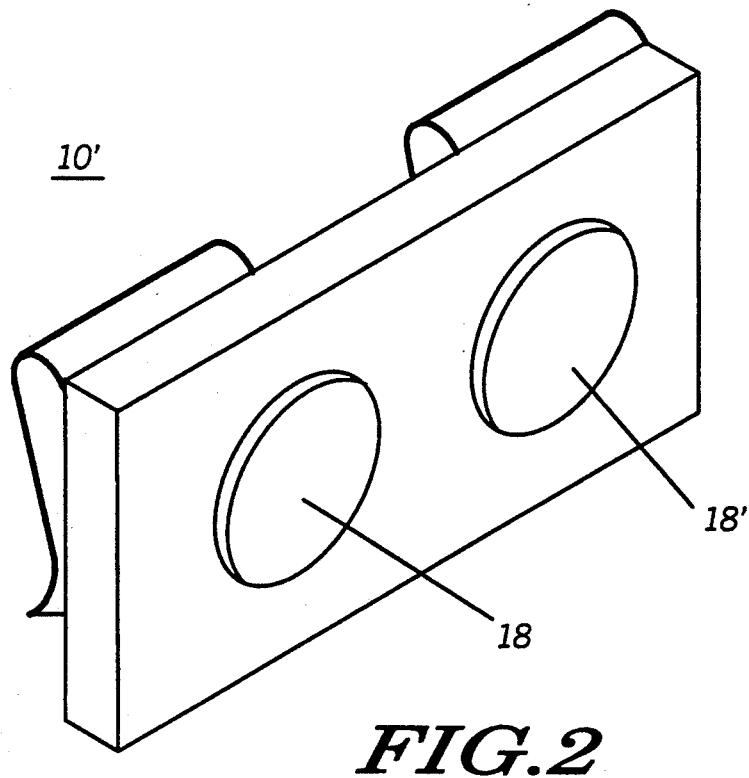
FIG. 2 is a second embodiment of the activation unit in accordance with the present invention.

Referring to FIG. 2, a second embodiment of the activation unit is shown in accordance with the invention. In this activation unit 10', there are two push buttons, 18 and 18'. Button A(18) causes an information signal A to be transmitted, while the push button B(18') causes an information signal B to be transmitted. These two push buttons 18 and 18' would replace the feature switch 24 of FIG. 1 when it was used for the selection of either a VOX controlled transmitter or a keyword controlled voice recognition function. Thus, button A(18) may trigger the mobile radio to begin transmitting via a VOX controlled transmitter, for example, to a base station, to alert a security guard, or to a building control system to open an outside door. On the other hand, the button B(18') may activate a radio voice recognition unit to begin listening to voice inputs to control or modify various radio or user specific parameters in the mobile radio. These radio parameters could include the adjustments or enablements of lights, siren, channel selection, CRT screen, radio volume, control panel, a transmitter, or an indicator light. User specific functions may include variations in the menu functions and scan lists.

Figure 3:
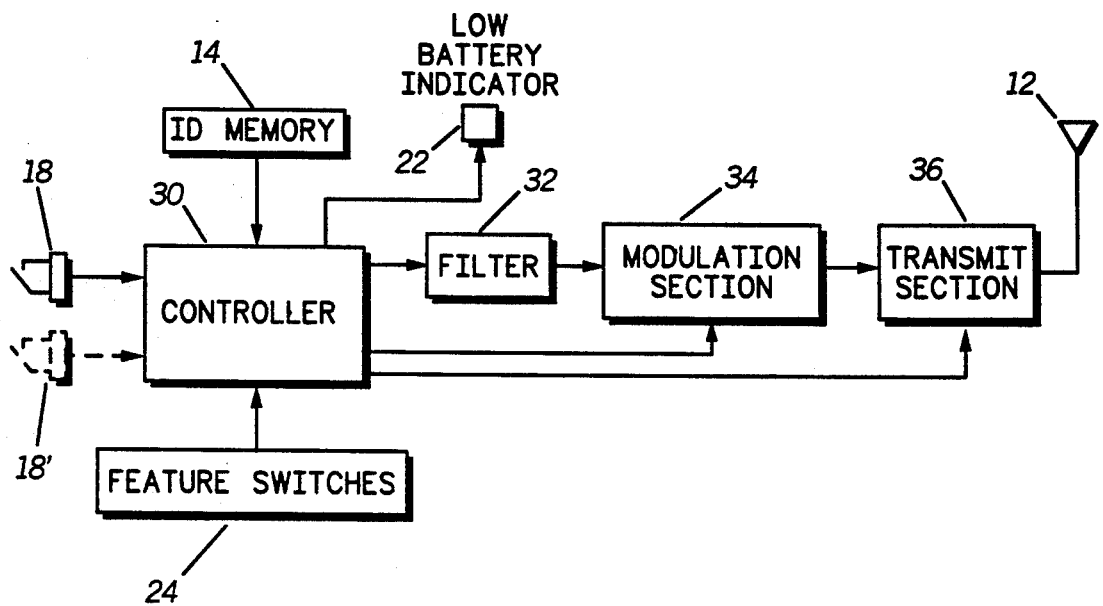
FIG. 3 is a block diagram of the activation unit 10 or 10' of FIGS. 1 or 2, respectively.

Referring to FIG. 3, a block diagram of the actual unit 10 or 10' of FIGS. 1 or 2, respectively is illustrated. Information from the ID memory 14, the actuation switch 18 or 18', and the feature switches 24 are coupled to a controller 30 where the information is decoded, added or combined into a data signal to be filtered (32). The controller 30 enables a modulation section 34 to modulate a carrier signal by this filtered data signal. In addition, the controller 30 enables a transmit section 36 to transmit this modulated signal via transmitter means 12 which may comprise an RF antenna, an ultrasonic transducer, an audio transducer, or an infrared emitter, depending on the type of transmission used. A second depression of the actuation switch 18 or 18' may be decoded by the controller 30 or a controller in the mobile radio as a deactivation signal instead of a triggering signal.

Figure 4:
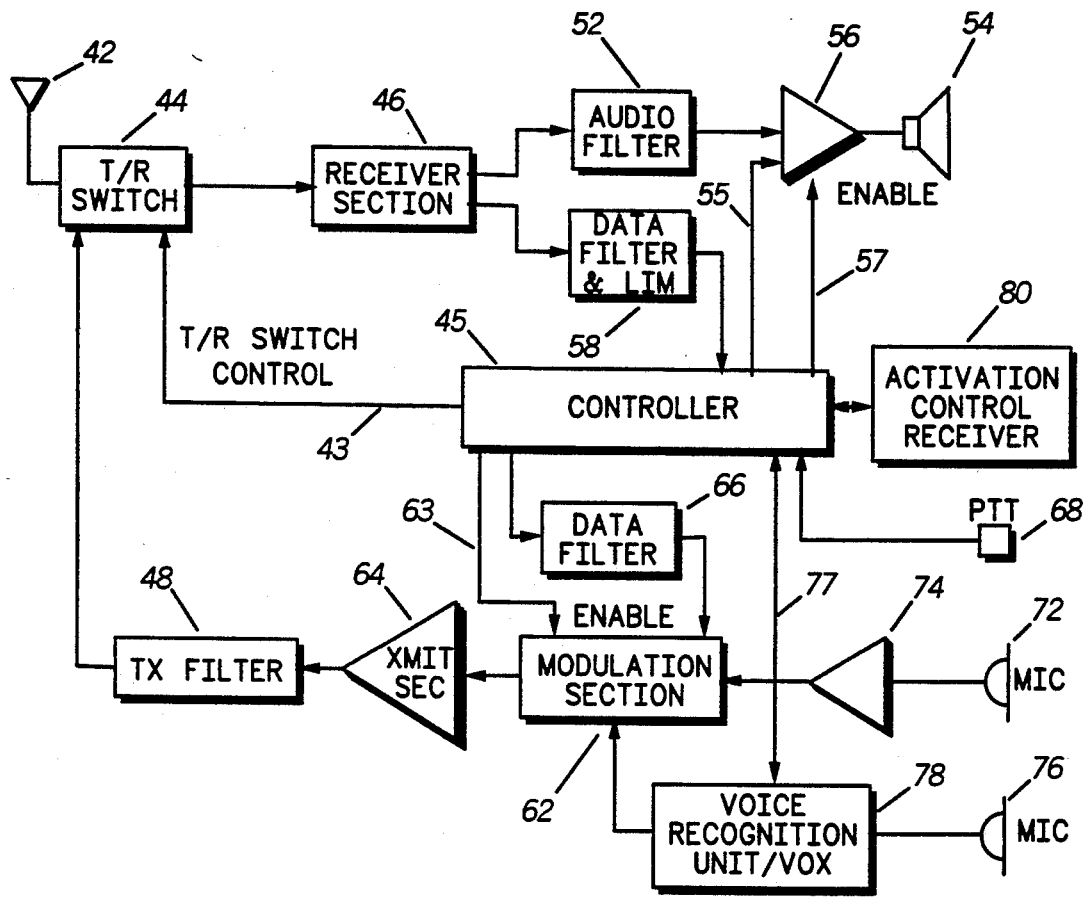
FIG. 4 is a block diagram of a mobile voice-operated radio in accordance with the invention.

Referring to FIG. 4, a mobile radio in accordance with the present invention is shown. The mobile radio has an antenna 42 which is connected through a transmit or receive switch 44 that is selected (43) by a controller 45 to connect to either a receiver section 46 or a transmit filter 48. The audio portion of the received signal is filtered in an audio filter 52 before being coupled to a speaker 54 via an audio amplifier 56 which is enabled (57) by the controller 45. The data portion of the receive signal is filtered and limited in a data filter and limiter block 58 before being coupled to the controller 45.

On the transmit side, a modulation section 62 enabled (63) by the controller 45 may modulate a carrier signal based on three different types of signals singly or in combination before the modulated signal is prepared for transmission in a transmit section 64 and filtered in the transmit filter 48. As a first type of an input signal to the modulation section 62, data signals may be sent by the controller 45 through a data filter 66. If convenient (as when stopped for a traffic light), a user may press the push to talk (PTT) switch 68 to enable the modulation section 62 to process a voice signal picked up by a microphone 72 and amplified in an amplifier 74 as a second type of an input signal to the modulation section 62. Conventionally, the microphone 72 and the PTT switch 68 may be combined in a hand-held unit. A second microphone 76 (which may be attached to a car visor to be in close proximity to a speaker's mouth) is coupled to a voice recognition unit or a voice activity detector, also known as a voice operated switch (VOX) 78 to provide a third type of input signal to the modulation section 62.

For clarity, the voice recognition unit and the VOX are shown together, but they may be used separately or in combination. Before the voice recognition unit/VOX 78 can operate, the triggering signal sent by the activation unit 10 or 10' has to be received by an activation control receiver 80 which is connected to the controller 45 to enable (77) the voice recognition unit or VOX 78.

After the voice recognition unit 78 is activated and a template selected by the controller 45, as triggered by the activation control receiver 80, subsequent voice commands detected and processed by the voice recognition unit 78 will be sent to the controller 45 to control various radio or user defined functions. For example, the transmit function of the mobile radio can be activated. The template selection by the controller 45 could be made based on the ID received from the remote activation unit 10, thus matching the voice template to the user in a speaker dependent system. However, this ID for matching would not be necessary in a speaker independent voice recognition system.

Alternately, after the VOX 78 is enabled by the controller 45 as triggered by the activation control receiver 80, voice signals picked up by the microphone 76 will modulate (62) a carrier signal and be transmitted (64) by the antenna 42.

Upon input fed from the activation control receiver 80 to the controller 45, a talk permit tone could be coupled (55) by the controller 45 to the speaker 54 via the audio amplifier 56 to generate an audible feedback. If activation switches 18 and 18' were both employed, distinct tones could be used to give the user audible feedback for each button. In addition, if a second button press represents a deactivation function, a different deactivation tone could be used separately for switches 18 and 18'.

If the information or triggering signal sent by the activation unit 10 were made up of one or more audio tones, the mobile unit might not require the activation control receiver 80. In this example, the voice recognition function 78 could be used to recognize the one or more audio tones and interpret these as commands, i.e., turn on the mobile transmitter. This one or more audio tones could also serve as an audible feedback for the user to know that the triggering signal was sent. Since listening for tones is more precise than listening for words in a conversation laden environment, the voice recognition unit 78 could thus be tone triggered.

Figure 5:
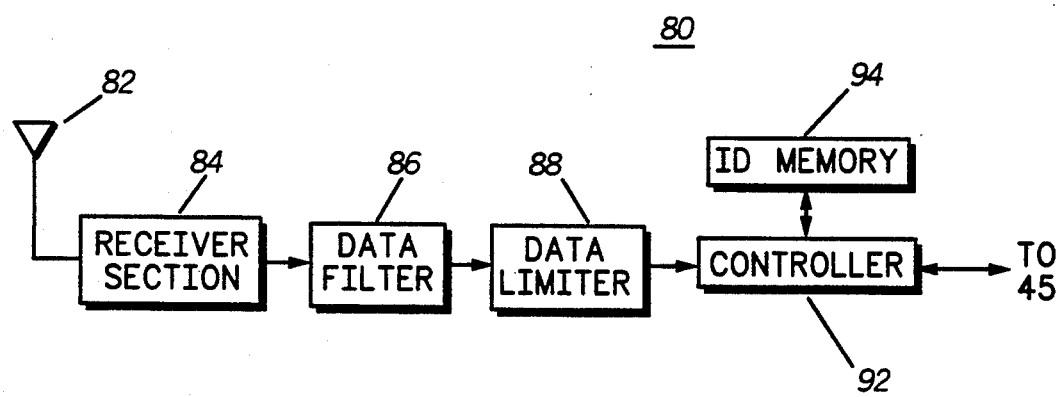
FIG. 5 is a block diagram of the activation control receiver of FIG. 4.

Referring to FIG. 5, the activation control receiver 80 of FIG. 4 is shown in block diagram. The triggering or information signal sent by the activation unit 10 or 10' of FIG. 1 or FIG. 2 is received by a receiving means 82 such as an antenna, an ultrasonic or audio transducer, or an infrared detector depending on the type of transmission used. The received signal is processed in a receiver section 84, filtered (86) and limited (88) to provide a clean data signal to a controller 92. The controller 92 monitors the incoming data from the data limiter 88 and may compare it to the ID and other information stored in an ID memory 94. When a match is made, the controller 92 informs the mobile radio controller 45 of FIG. 4. With this information, the controller 45 can determine which template to select such that a user may subsequently utilize the voice recognition unit 78. When a match is made with the other information contained in the ID memory 94 containing information for controlling radio functions (i.e. VOX or voice recognition keyword control) such as previously mentioned, the controller 92 also informs the mobile radio controller 45 to control these functions.

In operation, once the VOX circuit or the voice recognition system 78 is remotely triggered by the activation unit 10 or 10', the controller 45 will keep the voice recognition unit/VOX 78 active for a predetermined period of time. By triggering the voice recognition unit/VOX 78 in this manner, verbal commands can subsequently be detected and processed. The voice recognition unit/VOX 78 will remain active until a shutdown command is received (the shutdown command may be a second press or push of the actuation switch 18 or 18' or an actual verbal shutdown command), or a time-out occurs in which no commands were received in a predetermined period of time as determined by the controller 45.

When the mobile radio is in the transmit mode, the transmission will continue until a determination has been made to stop. This determination could be made by the VOX function 78 by analyzing various parameters of the audio signals received from the microphone 76. Since the user could pause in his or her speech which could be misinterpreted as the end of the transmission, there is a short period of time after the transmission has stopped that the VOX function 78 will continue to monitor the input from the microphone 76. In a similar case, the user may pause for someone at the base to reply, this reply coming through the mobile radio receiver. Since the user is actively using the radio and is engaged in a conversation, various VOX detection parameters may be changed during this time to optimize the detection of the user's speech. If a VOX detection is made during this time that the radio is in use, the transmit function of the radio could be re-enabled without re-triggering.

What is claimed is:

1. A remotely triggered communication system, comprising:
 a remote transmitter comprising:
 memory means for storing a personal identification of a user out of a plurality of voice-operated radio users;
 transmitter means for transmitting an information signal including the personal identification of said user out of said plurality of voice-operated radio users, from said memory means;
 triggering means for triggering said transmitter means, by said user, to transmit said information signal; and
 a voice-operated radio comprising:
 a receiver for receiving said information signal from said transmitter means of said remote transmitter;
 audio sample capturing means for capturing audio samples of voice inputs;
 controller means for synchronizing the initiation of said audio sample capturing means to start capturing said audio samples of current voice inputs transmitter; only when said information signal has been received by said receiver;
 template storage means for storing reference voice templates of said plurality of voice-operated radio users;
 reference template selection means for selecting and retrieving a proper reference voice template from said template storage means that corresponds to said personal identification of said user out of said plurality of voice-operated radio users;

voice operation means for activating an operation of said voice-operated radio based on said information signal, in response to retrieving said proper reference voice template;

determining means for determining when a termination of said operation of said radio is desired, in response to the absence or presence of subsequent voice inputs; and deactivating means for deactivating said operation of said radio in response to said determining means.

2. The remotely triggered communication system of claim 1, wherein said triggering means deactivates said operation of said radio based on an deactivation signal.

3. The remotely triggered communication system of claim 1, wherein said determining means comprises a voice activity detector for detecting when at least a voice threshold level has not been received for a predetermined period.

4. The remotely triggered communication system of claim 2, wherein said determining means comprises a controller for detecting when said deactivation signal is received.

5. The remotely triggered system of claim 3, wherein said deactivating means comprises switching means to deactivate said operation of said radio after said predetermined period has elapsed.

6. The remotely triggered system of claim 4, wherein said deactivating means comprises switching means to deactivate said operation of said radio in response to said deactivation signal.

7. The remotely triggered system of claim 1, wherein said transmitter means comprises an audio transducer.

8. The remotely triggered system of claim 7, wherein said audio transducer transmits at least one tone.

9. The remotely triggered system of claim 1, wherein said information signal provides information pertaining to said operation of said radio.

10. The remotely triggered system of claim 1, wherein said transmitter means comprises an infra-red emitter for transmitting an infra-red signal.

11. The remotely triggered system of claim 1, wherein said transmitter means comprises an ultra-sonic transducer for transmitting an ultra-sonic signal.

12. The remotely triggered system of claim 1, wherein said transmitter means comprises an antenna for transmitting low power radio frequency signals.

13. The remotely triggered system of claim 1, further comprising:

means for generating a feedback signal in said radio when said information signal is received; and speaker means responsive to said feedback signal to generate an audible feedback signal in said radio.

14. The remotely triggered system of claim 1, wherein said triggering means comprises:

sensing means for sensing a button press; and encoder means for generating said information signal in response to said sensing means.

15. The remotely triggered system of claim 1, wherein said triggering means comprises:

switching means for selecting said operation of said radio; and encoder means for generating said information signal including information on said operation selected in response to said switching means.

16. The remotely triggered system of claim 15, further comprising a controller for modifying said operation of said radio in response to said information signal including information on said operation selected.

17. The remotely triggered system of claim 1, wherein said operation of said radio comprises an operation of a voice recogniser for detecting and processing said audio samples to operate said radio.

18. The remotely triggered system of claim 17, further comprising a controller for selecting said proper voice template in response to said information signal for operation of said voice recognizer to recognize said audio samples.

19. The remotely triggered system of claim 1, wherein said deactivating means comprises switching means to deactivate said operation of said radio in response to a deactivating verbal command.

20. The remotely triggered system of claim 17, wherein said determining means comprises said voice recognizer for detecting when no voice commands are received for a predetermined period.

21. The remotely triggered system of claim 1, wherein said operation of said radio comprises an operation of a voice operated switch of said radio.

22. The remotely triggered system of claim 21, wherein said operation of said radio comprises an operation of said voice operated switch to activate a local transmitter of said radio.

23. The remotely triggered system of claim 1, wherein said operation of said radio comprises an operation of a voice operated switch and a local transmitter of said radio.

24. A remotely triggered communication system, comprising:

a portable transmitter comprising:

memory means for storing a personal identification of a user out of a plurality of voice-operated mobile radio users;

push-to-transmit and push-to-recognize switch means for sensing a button press to provide a push-to-transmit and push-to-recognize signal;

encoder means to encode said personal identification, from said memory means, in an information signal, in response to said sensing means;

transmitter means for transmitting said information signal, from said encoder means, including the personal identification of said user out of said plurality of voice-operated radio users, responsive to said push-to-transmit and push-to-recognize signal; and a voice-operated mobile radio mounted in a vehicle comprising:

a mobile receiver and antenna to receive said information signal, from said transmitter means of said portable transmitter, including said personal identification;

a controller, responsive to said information signal, for providing an initial activation signal;

voice recognition means, responsive to said initial activation signal, for controlling said voice-operated radio, wherein said voice recognition means are usually switched OFF until said receiver receives said information signal, said voice recognition means comprising:

template storage means for storing reference voice templates of said plurality of voice-operated radio users;

audio sample capturing means, responsive to said initial activation signal, for capturing audio samples of voice inputs;

reference template selection means for matching a proper reference voice template from said template storage means that corresponds to said personal identification of said user out of said plurality of voice-operated mobile radio users with said user; and said voice recognition means controlled by said controller, immediately recognizing said voice inputs, from said audio sample capturing means, to activate an operation of said voice-operated radio.

25. The remotely triggered communication system of claim 1, wherein said voice-operated radio has plural potential operating conditions including at least transmit and volume control, said radio comprising:

said voice operation means comprising a voice recognition unit for receiving said current voice inputs as audible verbal phrases spoken by said user, for recognizing each of predetermined plural spoken phrases which define predetermined desired respectively corresponding ones of said operating conditions, and for producing a respectively corresponding predetermined control signal in response to each of said predetermined spoken phrases; and said controller means for controlling the operation of said radio with respect to said operating conditions, in response to said production of a corresponding one of said predetermined control signals.

* * * * *

UNITED STATES PATENT AND TRADEMARK OFFICE
CERTIFICATE OF CORRECTION

PATENT NO. : 5,263,181
DATED : November 16, 1993
INVENTOR(S) : John D. Reed

It is certified that error appears in the above-identified patent and that said Letters Patent is hereby corrected as shown below:

Column 6, claim 1, line 62, delete "transmitter;".
Column 8, claim 17, line 7, delete "recogniser" and insert therefor --
.

Signed and Sealed this

Twenty-eighth Day of June, 1994

Attest:

BRUCE LEHMAN

Attesting Officer     Commissioner of Patents and Trademarks